(12) United States Patent
Takashima et al.

(10) Patent No.: US 7,539,574 B2
(45) Date of Patent: May 26, 2009

(54) VEHICULAR NAVIGATION SYSTEM

(75) Inventors: Kenji Takashima, Obu (JP); Wataru Sugiura, Anjo (JP)

(73) Assignee: DENSO CORPORATION, Kariya (JP)

( * ) Notice: Subject to any disclaimer, the term of this patent is extended or adjusted under 35 U.S.C. 154(b) by 442 days.

(21) Appl. No.: 11/366,545

(22) Filed: Mar. 3, 2006

(65) Prior Publication Data
US 2006/0217882 A1 Sep. 28, 2006

(30) Foreign Application Priority Data
Mar. 22, 2005 (JP) ............................. 2005-082257
Jul. 7, 2005 (JP) ............................. 2005-198789

(51) Int. Cl.
*G01C 21/30* (2006.01)

(52) U.S. Cl. ................ 701/208; 701/207; 701/209; 701/211; 701/212; 340/988; 340/995.1; 340/995.25

(58) Field of Classification Search ......... 701/207–209, 701/211–212; 340/988, 995.1, 995.25
See application file for complete search history.

(56) References Cited

U.S. PATENT DOCUMENTS

| | | | |
|---|---|---|---|
| 5,444,629 A | 8/1995 | Kishi et al. | |
| 5,687,083 A | 11/1997 | Kishi et al. | |
| 5,910,177 A | * 6/1999 | Zuber | ............ 701/202 |
| 6,108,604 A | 8/2000 | Fukaya et al. | |
| 6,127,969 A | 10/2000 | Van Roekel | |
| 6,934,627 B2 | 8/2005 | Kawakami et al. | |

FOREIGN PATENT DOCUMENTS

| | | |
|---|---|---|
| JP | A-11-248479 | 9/1999 |
| JP | A-2002-202146 | 7/2002 |
| JP | A-2004-108969 | 4/2004 |

OTHER PUBLICATIONS

Office Action dated Feb. 19, 2008 in corresponding Japanese Patent Application No. 2005-082257 (and English translation).
Office Action dated Dec. 19, 2008 in corresponding Chinese Patent Application No. 2006100598627 (and English translation).

* cited by examiner

*Primary Examiner*—Gertrude Arthur Jeanglaud
(74) *Attorney, Agent, or Firm*—Posz Law Group, PLC

(57) ABSTRACT

With respect to a connection road linked with a rotary included in a guidance route, a vehicular navigation system acquires a dummy link that is defined to extend towards an inside of the rotary based on road map data. An advancing direction at the rotary is computed by using an angle defined by two dummy links with respect to both an entering road being the connection road on which the vehicle is to approach the rotary and an exiting road being the connection road on which the vehicle is to recede from the rotary. Guidance information at the rotary is outputted based on the computed advancing direction when the vehicle approaches the rotary.

9 Claims, 11 Drawing Sheets

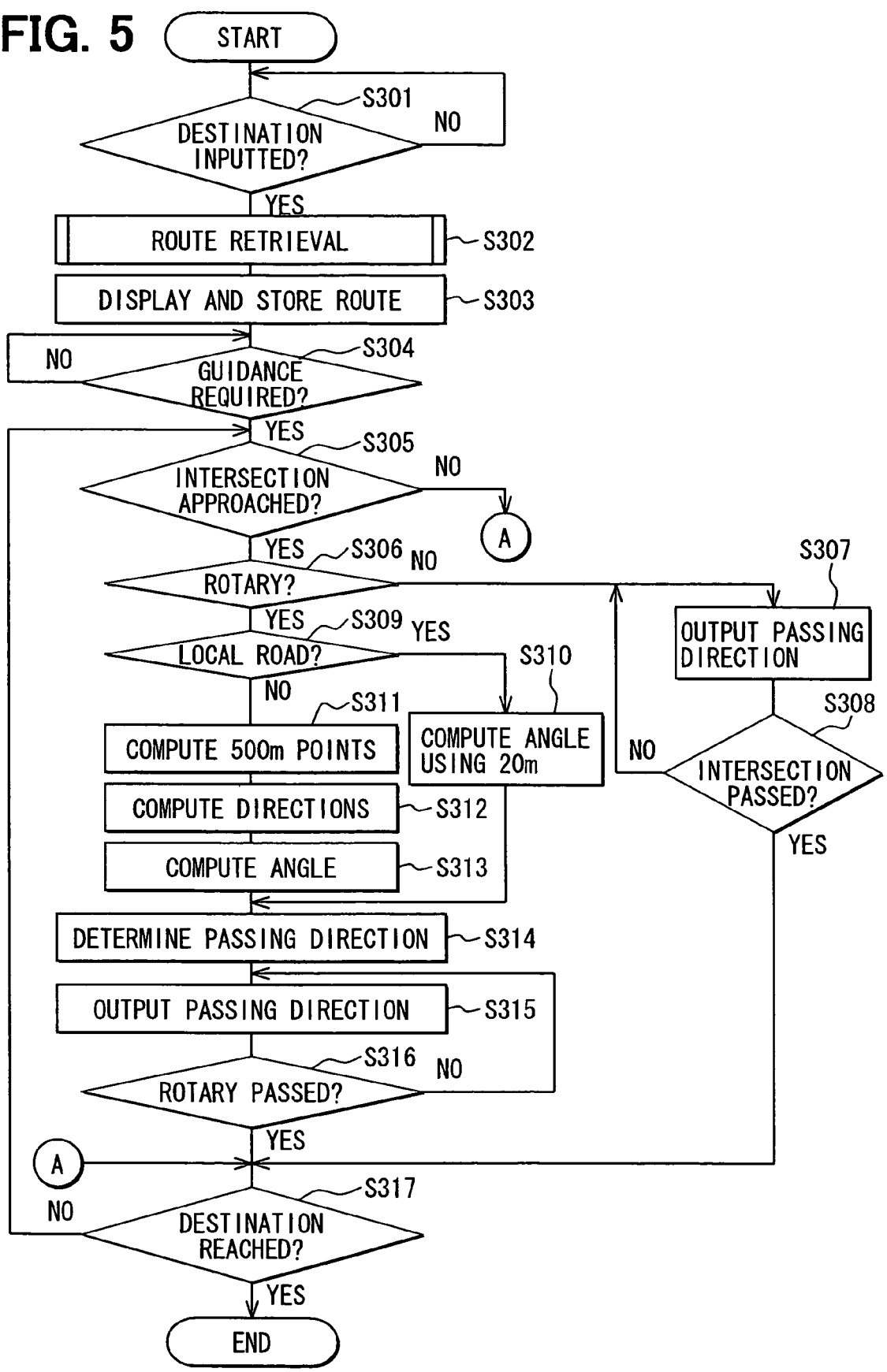

| NODE | ID |
| | COORDINATE |
| | CONNECTING LINK IDS |
| | ATTRIBUTE |
| LINK | ID |
| | ROAD NAME |
| | LENGTH |
| | WIDTH |
| | ROAD KIND |
| | START COORDINATE |
| | END COORDINATE |
| | DIRECTION |
| | ROTARY INFO |

<u>PRIOR ART</u>

VEHICULAR NAVIGATION SYSTEM

CROSS REFERENCE TO RELATED APPLICATIONS

This application is based on and incorporates herein by reference Japanese Patent Applications No. 2005-82257 filed on Mar. 22, 2005, and No. 2005-198789 filed on Jul. 7, 2005.

FIELD OF THE INVENTION

The present invention relates to a vehicular navigation system capable of properly navigating at a rotary (also referred to as round about or traffic circle).

BACKGROUND OF THE INVENTION

A vehicular navigation system detects a current position of the vehicle (e.g., using Global Positioning System), displays a map with the current position marked on a display screen, and navigates along an optimum route to a destination. In particular, an intersection on the route is emphasized on the screen while an advancing direction in which the vehicle should advance is indicated.

An intersection may be a rotary. As the vehicle approaches the rotary, a passing direction or advancing direction in which the vehicle should pass through the rotary is indicated using an arrow on the screen and/or via voice (see Patent Document 1).

In Patent Document 1, whether the vehicle travels straight (straight-travel) is determined based on (i) an angle difference between an entering road and exiting road and (ii) a given angle defined as an attachment angle with respect to the entering road and exiting road. For instance, when an angle difference is 30 degrees or less, straight-travel is determined as an advancing direction and guided to a user. When an angle difference is from 30 to 45 degrees, and additionally when an attachment angle is 30 degrees or less, straight-travel is also determined as an advancing direction.

Furthermore, that the vehicle should take a U-turn at the rotary via a one-way road is determined when the following conditions are satisfied at the same time: an angle difference between an entering and exiting roads is from 150 to 210 degrees; the entering and exiting roads are one-way traffic roads with the same name; and connection roads to the entering and exit roads are adjacent two-way traffic roads and have the same road number. In other words, the vehicle travels a connection road, a first one-way traffic road entering the rotary, almost one circuit of a rotary link, a second one-way traffic road exiting from the rotary, and then the connection road again.

Furthermore, angle variations from the first one-way traffic road though the rotary link to the second one-way traffic road are integrated positively (counterclockwise) and negatively (clockwise). The integrated angle θ is categorized into the following and corresponding guidance is provided: −180 degrees<θ<−150 degrees is for returning to right; −150 degrees<θ<0 degree is for turning right; 0 degree<θ<+150 degrees is for turning left; and +150 degrees<θ<+180 degree is for returning to left.

As explained above, the navigation system in Patent Document 1 needs the very complicated computation using various factors or determinations for navigating at the rotary such as straight-travel, U-turn along a one-way traffic road, or right or left turn. Furthermore, guidance provided or indicated at the rotary is sometimes different from what the user actually senses or feels while passing through the rotary.

An example will be explained below with reference to FIG. 13. Roads LA, LB, LC, LD are two-way traffic roads and entering into or exiting from a rotary via bifurcated one-way traffic roads LAi, LAo, LBi, LBo, LCi, LCo, LDi, LDo. A guidance route designated from LA through LAi, a rotary link, and LDo to LD is shown as a bold line in FIG. 13. Here, the above navigation system in Patent Document 1 provides guidance based on an angle α between LAi and LDo to output "sharply right bearing." However, since LAi and LDo have short distances, the user senses that the vehicle takes a typical right bearing from LA to LD, which makes the user feel discrepancy in the guidance. If a guidance route is from LA through LAi, a rotary link, LCo to LC, the guidance is unnaturally outputted as "slightly right bearing."

Patent Document 1: JP-H11-51684 A (U.S. Pat. No. 6,108,604)

SUMMARY OF THE INVENTION

It is an object of the present invention to provide a navigation system that properly navigates at a rotary while decreasing processing loads.

To achieve the above object, as a first aspect, a navigation system in a vehicle is provided with the following: a position detector is included for detecting a current position of the vehicle; a map data storage unit is included for storing road map data indicating a road by links; a route designating unit is included for designating a guidance route to a destination based on the road map data; and a navigating unit is included for indicating an advancing direction, in which the vehicle should advance at a guidance target included in the guidance route, when the current position approaches the guidance target. Here, the road map data includes a dummy link defined by linking a center of a rotary with an end point of a connection road link that is connected at the end point with a rotary link having an attribute associated with the rotary. When a rotary is the guidance target, the navigating unit designates (i) a first dummy link linked with a connection road link corresponding to a guidance route entering the rotary and (ii) a second dummy link linked with a connection road link corresponding to a guidance route exiting from the rotary, and indicates an advancing direction of the vehicle at the rotary based on an angle difference between the first dummy link and the second dummy link.

To achieve the above object, as a second aspect, a navigation system in a vehicle is provided with the following: a position detector is included for obtaining a current position of the vehicle; a map data obtaining unit is included for obtaining map data; an outputting unit is included for outputting information for navigating; an advancing direction computing unit is included for computing an advancing direction at a rotary included in a guidance route based on the map data when the current position approaches the rotary; and a navigation control unit is included for outputting, to the outputting unit, guidance information based on the computed advancing direction. Here, the advancing direction computing unit computes (i) a straight line including both a connecting point connected with the rotary and a given point by a given distance away from the connecting point, with respect to each of an entering road to the rotary and an exiting road exiting from the rotary, (ii) an angle formed by two straight lines with respect to the entering road and the exiting road, and (iii) an advancing direction at the rotary based on the computed angle.

To achieve the above object, as a third aspect, a navigation system in a vehicle is provided with the following: a position detector is included for obtaining a current position of the vehicle; a map data obtaining unit is included for obtaining map data; an outputting unit is included for outputting information for navigating; an advancing direction computing unit is included for computing an advancing direction at a rotary included in the guidance route based on the map data when the current position approaches the rotary; and a navigation control unit is included for outputting, to the outputting unit, guidance information based on the computed advancing direction. Here, the advancing direction computing unit computes (i) an extended line extended in a road direction of the given point that is by a given distance away from a connecting point connected with the rotary, with respect to each of an entering road to the rotary and an exiting road exiting from the rotary, (ii) an angle formed by extended lines with respect to the entering road and the exiting road, and (iii) an advancing direction at the rotary based on the computed angle.

To achieve the above object, as a fourth aspect, a navigation system in a vehicle is provided with the following: a position detector is included for detecting a current position of the vehicle; a dummy link acquiring unit is included for acquiring a dummy link with respect to a connection road linked with a rotary included in the guidance route, the dummy link being defined to extend towards an inside of the rotary based on road map data; an advancing direction computing unit is included for computing an advancing direction at the rotary by using an angle defined by two dummy links with respect to both (i) an entering road being the connection road on which the vehicle is to approach the rotary and (ii) an exiting road being the connection road on which the vehicle is to recede from the rotary; and a navigating unit is included for indicating guidance information at the rotary based on the computed advancing direction when the current position of the vehicle approaches the rotary.

Under each of the above four structures, virtual links or dummy links are provided for properly obtaining an advancing direction in which a vehicle should follow at a rotary. This allows an advancing direction at a rotary to be computed in the same manner that an advancing direction at a typical intersection is computed, decreasing a processing load in conventionally computing an advancing direction at a rotary. Furthermore, direction guidance indicating the advancing direction obtained by using the virtual links can meet user's sense or feeling at the rotary even when a connection road linked with the rotary is curved close to the rotary.

BRIEF DESCRIPTION OF THE DRAWINGS

The above and other objects, features, and advantages of the present invention will become more apparent from the following detailed description made with reference to the accompanying drawings. In the drawings:

FIG. 5 is a flowchart diagram of a process for determining an advancing direction according to a second embodiment of the present invention;

DETAILED DESCRIPTION OF THE PREFERRED EMBODIMENTS

First Embodiment

A navigation system according to a first embodiment will be explained with reference to FIGS. 1 to 4.

Figure 1:
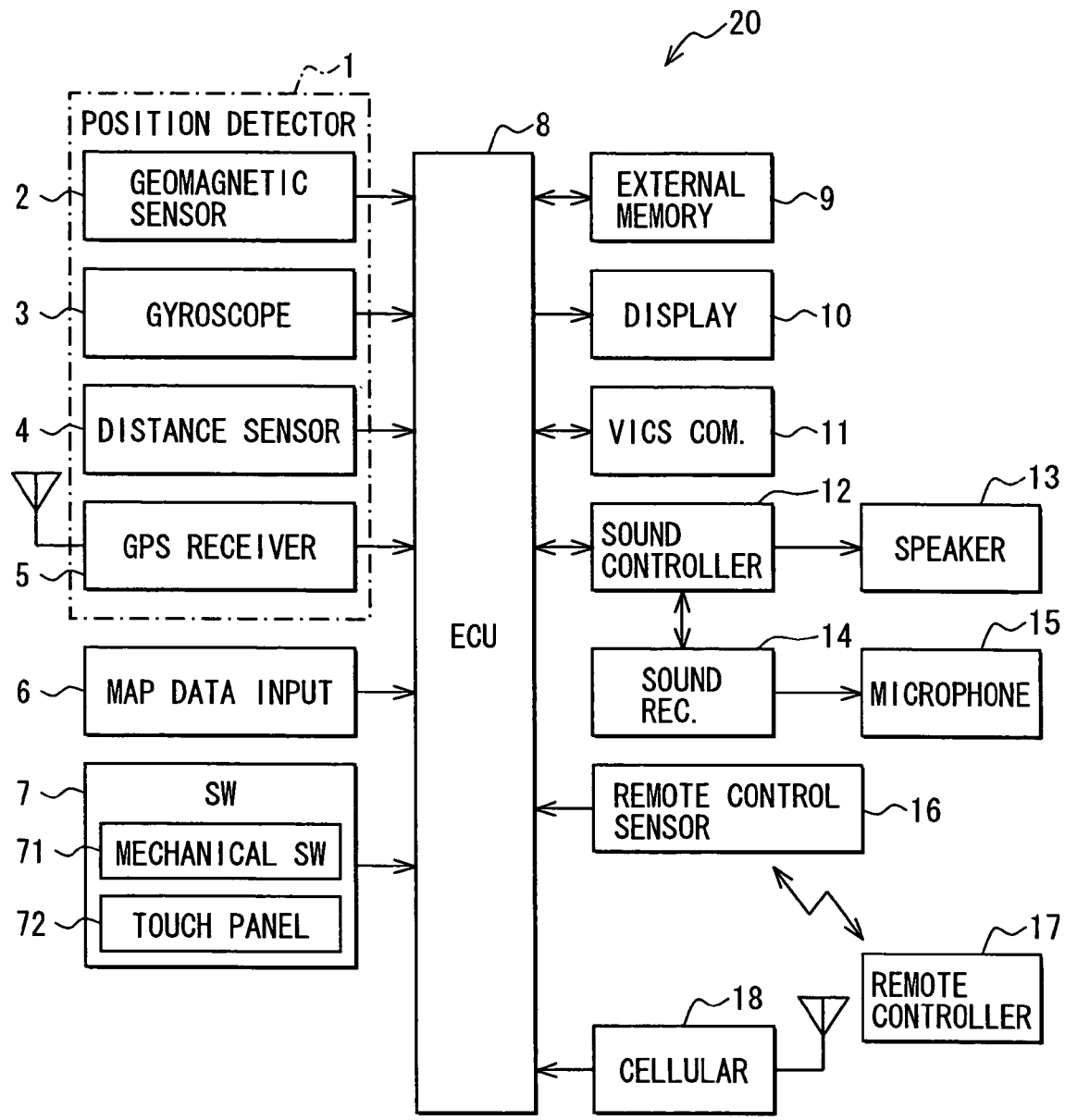
FIG. 1 is a block diagram of a schematic structure of a navigation system according to a first embodiment of the present invention.

As shown in FIG. 1, a navigation system 20 in a vehicle includes a position detector 1, a map data input unit 6, a manipulation switch group 7, an external memory 9, a display apparatus 10, a VICS communicating unit 11, a sound controller 12, a remote control sensor 16, a cellular phone 18, and a navigation ECU 8 as a control circuit connected with the foregoing apparatus and the like.

The ECU 8 is a known computer including a CPU, ROM, RAM, I/O, and a bus line connected with the foregoing components. The ROM includes a program executed by the ECU 8; the CPU or the like executes computation based on the program.

The position detector 1 includes a known geomagnetic sensor 2, gyroscope 3, a vehicle speed (distance) sensor 4, and a GPS (Global Positioning System) receiver 5 for detecting a current position of the vehicle based on radio waves from satellites. These sensors or the like 2 to 5 have individually different types of errors; therefore, they are complemented by each other. The position detector 1 can be constituted by some of the above sensors depending on a detection accuracy requirement.

The map data input unit 6 inputs map data necessary for drawing a map, to the ECU 8. The map data includes road data having node data and link data, background data for indicating geography, and character data for displaying place names. The map data input unit 6 includes a storage medium or unit to store the map data. The storage medium is typically a CD-ROM or DVD-ROM from a requirement of a data volume, but, may be replaced by a rewritable storage medium or unit such as an HDD or a memory card. The road data will be additionally explained later.

The manipulation switch group 7 may be a mechanical switches 71 or touch panel switches 72, which is integrated around a screen 10a of the display apparatus 10, to be used for inputting data.

The external memory 9 includes a rewritable storage medium or unit such as a memory card or HDD to store data such as text data or image data.

The display apparatus 10 is, e.g., a liquid crystal display to display, on its screen 10a, (i) a road map, which is generated from the map data inputted from the map data input unit 6, surrounding a vehicle's current position detected by the position detector 1, and (ii) a mark corresponding to the current position.

The VICS communicating unit receives road traffic information distributed from a VICS (Vehicle Information and Communication System) center via a beacon laid under a road or an FM station, and transmits necessary information to the beacon. The traffic information received is processed by the ECU 8; for instance, traffic regulation information or congestion information is displayed on the map displayed on the screen 10a.

The cellular phone 18 as a wireless communications unit can be connected to the Internet or a cellular phone network via a base station; therefore, the cellular phone 18 may be used for acquiring map data to transmit current position information to a map information center and receive map data relating to the current position and its proximity.

The sound controller 12 is connected to the sound recognition apparatus 14 to recognize sound signals from the microphone 15; the sound controller 12 retrieves the recognized information and outputs, to the ECU 8, operation signals corresponding to the sound signals. The sound controller 12 further outputs, to the speaker 13, a synthetic sound or alarming sound required by the ECU 8 for navigating along a route the vehicle should follow.

The remote control sensor 16 receives an operation signal by wireless from a remote controller 17 that is used also for inputting data. For instance, the navigation system 20 has a route guidance function or navigation function; when a destination is inputted via the remote controller 17 or manipulation switch group 7, an optimum route to the destination is automatically retrieved or designated and navigation is performed along the retrieved route. At this time, the route is emphatically displayed on the map; as the vehicle approaches a guidance target such as an intersection or a rotary, the guidance target is displayed in a magnified form and/or an advancing direction in which the vehicle should advance is indicated by voice.

The road data will be additionally explained below with respect to a structure of node data and link data. A road on a map is divided into links at nodes at which roads merge, intersect, or branch: node data and link data can be used for drawing a road on a map. Node data includes, with respect to a node, a node ID uniquely assigned to the node, node coordinates, a node name, link IDs of links connected with the node, an intersection type, presence or absence of a traffic light, traffic regulation information, etc.

Link data includes, with respect to a link, a link ID uniquely assigned to the link, a link length, coordinates of start and end points, a road type (e.g., expressway, toll road, national road, prefectural road, local road, road inside a rotary, connection road to a rotary), a road width, the number of lanes, a traveling time, a regulated speed, etc.

In this embodiment, a dummy link (or virtual link) is stored in the storage medium of the map data input unit 6 to be used not in a display but only in a voice guidance for outputting an advancing direction in which a vehicle should advance at a rotary. When there are an entering communication link and an exiting communication link between a rotary and a connection road link, a dummy link is defined to link an inside center of the rotary with an end point of the connection road link.

These entering and exiting communication links will be explained with reference to FIG. 4. When a rotary R has a large diameter or when a rotary and its connection road have wide road widthes, a vehicle sometimes travels, at a slant, an interval distance between the connection road and the rotary, instead of entering into or exiting from the rotary at a right angle. When a connection road link La, Ld is connected to a rotary R of rotary links R1 to R6 at a right angle, an actually traveling position of the vehicle may deviate from the connection links La, Ld. This may decrease accuracy of vehicle positioning. Therefore, to solve this problem, an entering communication link La1, Ld1 and exiting communication link La2, Ld2 are added as data to the connection road link La, Ld, respectively, for agreeing with the actual traveling position.

Furthermore, in fact, a one-way traffic entering or exiting communication road may be actually constructed and existing between a rotary R and a connection road so that a vehicle easily enters into or exits from the rotary R. In this case, a corresponding entering communication link La1, Ld1 and a corresponding exiting communication link La2, Ld2 are present between the connection road link La, Ld and the rotary R, respectively.

Figure 4:
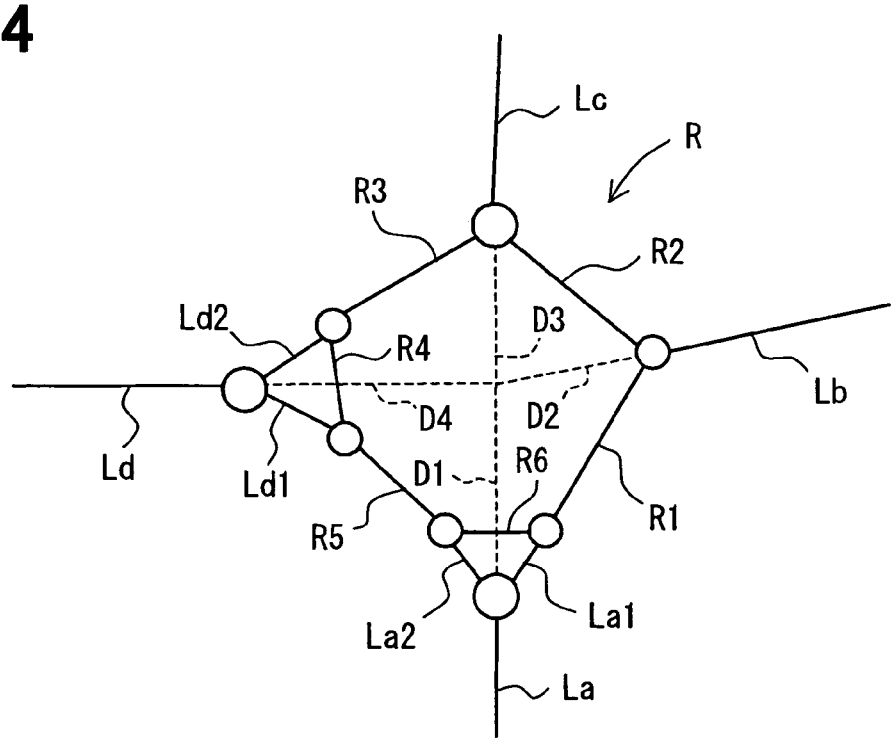
FIG. 4 is a view explaining a process for determining an advancing direction at a rotary according to the first embodiment.

In FIG. 4, a vehicle travels the rotary R counterclockwise. An entering communication link La1, Ld1 is right from a viewpoint facing the rotary R while an exiting communication link La2, Ld2 is left.

In FIG. 4, dummy links D2, D3 are defined to link a center of the rotary R with rotary-side end points of the connection road links Lb, Lc. Dummy links D1, D4 are defined to connect the center of the rotary R with rotary-side end points of the connection road links La, Ld, excluding the entering and exiting communication links La1, La2, Ld1, Ld2. Here, the center of the rotary need not be accurately located at the center of the rotary R, but only needs to be defined at a point inside the rotary.

The dummy links D1 to D4 are stored while associated with identification information for identifying the rotary R or relevant connection road links. This allows a dummy link to be read out from the storage medium.

Figure 2:
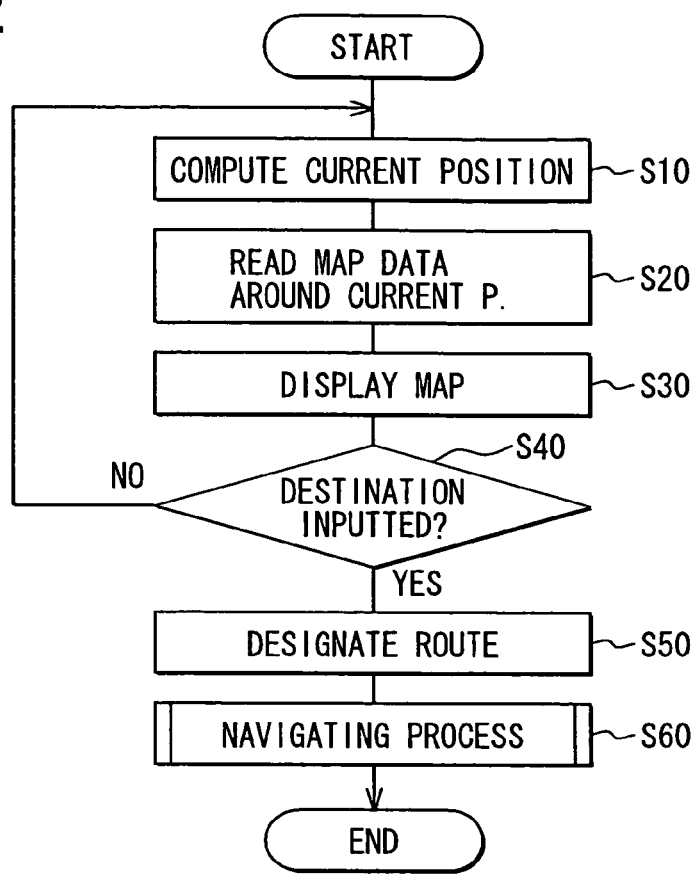
FIG. 2 is a flowchart diagram of a main routine for displaying a map or the like executed by the navigation system.

Next, a main routine executed for displaying a map or the like will be explained with reference to a flowchart in FIG. 2. In this routine, when a destination is designated, a navigating process starts.

At Step S10, a current position is computed based on position data detected by individual sensors of the position detector 1. Position data by the GPS receiver 5 are obtained in the same format as coordinates data (longitude and latitude) of the road data. At the same time, data relating to an advancing direction of the vehicle and a travel distance are obtained from the geomagnetic sensor 2, gyroscope 3, and vehicle speed sensor 4. Coordinates data of the current position are computed with a self-contained navigation method based on a vehicle's position previously obtained or determined.

The current position is computed basically based on the coordinates data from the self-contained navigation method. In a case that position data from the GPS receiver 5 is available, the position data by the GPS receiver 5 can be adopted when more than a given distance difference is determined between the position data by the self-contained navigation method and the position data by the GPS receiver 5.

At Step S20, map data relating to an area surrounding the vehicle is read out based on the coordinates of the current position computed at Step S10. At. Step S30, a vehicle's mark indicating the current position and the surrounding map are displayed on the display apparatus 10. At this time, the current position is designated on a road by using a map-matching process, and the vehicle's mark corresponding to the designated current position is displayed.

At Step S40, it is determined whether a destination is designated via the manipulation switch group 7 or remote controller 17. When a destination is determined to not be designated, Step S10 is repeated. When a destination is determined to be designated, Step S50 is then performed.

At Step S50, an optimum route from the current position or a start point designated by a user to the destination is retrieved based on the road data by using the known Dijkstra method or the like. If a user requires an execution of navigating along the retrieved route (or guidance route), a navigating process at Step S60 is performed.

Figure 3:
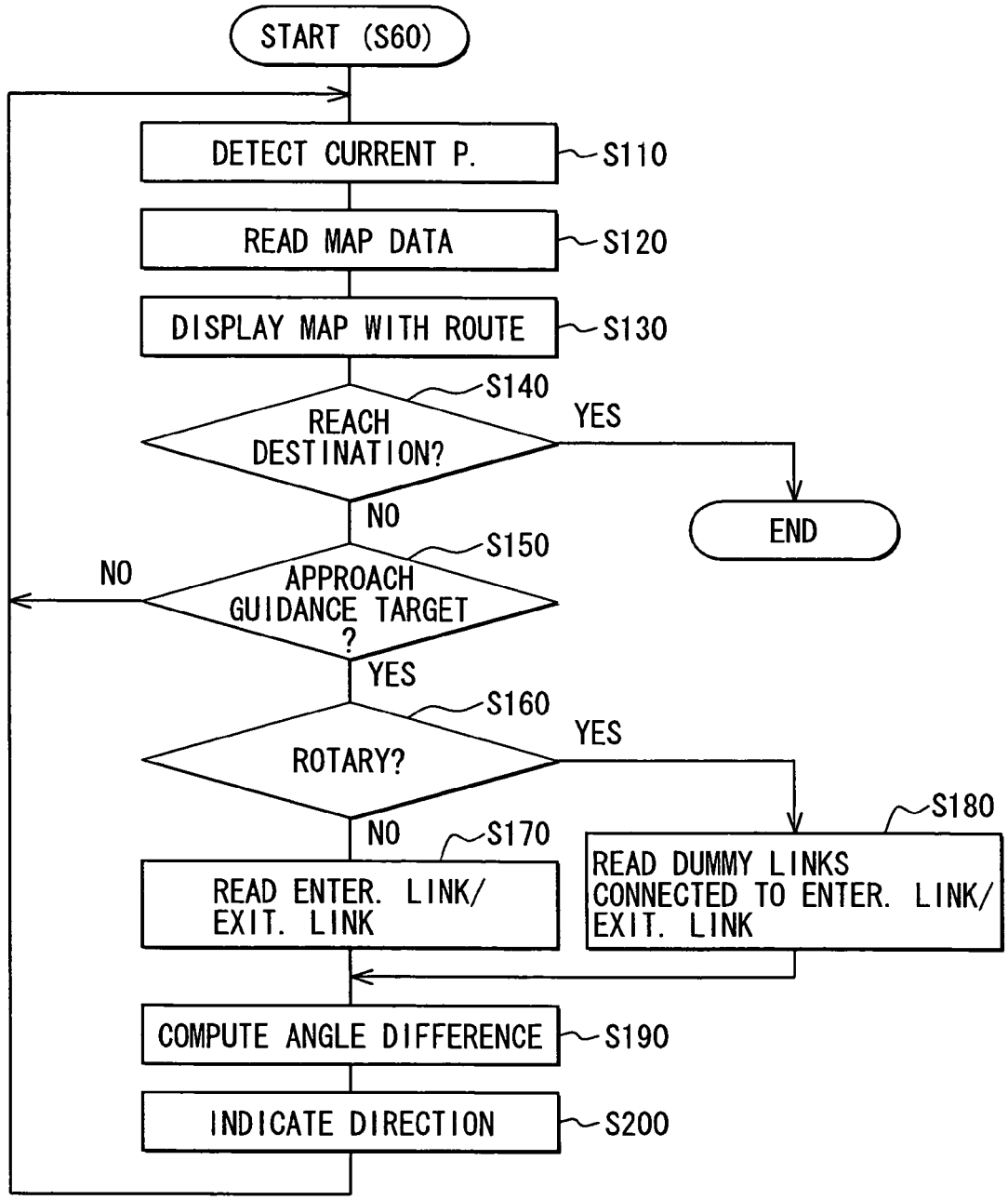
FIG. 3 is a flowchart diagram of a navigating process in FIG. 2.

This navigating process will be explained with reference to a flowchart in FIG. 3. At Step S110, a current position of the vehicle is detected. At Step S120, map data relating to an area surrounding the current position is read out. At Step S130, a vehicle's mark indicating the current position and its surrounding area's map are displayed with a road corresponding to the guidance route emphasized in color or the like.

Next, at Step S140, it is determined whether the vehicle reaches the destination. When the vehicle is determined to reach the destination, the navigating process in FIG. 3 is terminated. When the vehicle is determined to not reach the destination, it is determined whether the vehicle approaches a guidance target such as an intersection or a rotary within a given distance at Step S150.

When this determination is negated, Step S110 is repeated. When affirmed, it is then determined whether the guidance target is a rotary at Step S160. For instance, when a road the vehicle is traveling is a connection road to a rotary, the guidance target is determined to be a rotary. Alternatively, when there is a link having a road type of a rotary link or a road inside a rotary within a given distance from the current position, among link data included in the guidance route, the guidance target is determined to be a rotary. Alternatively, when there is node data that is included in the route and indicates branching to a rotary, the guidance target is determined to be a rotary.

When the guidance target is determined to be not a rotary at Step S160, Step S170 is performed. When the guidance target is determined to be a rotary at Step S160, Step S180 is performed. At Step S170, with respect to the intersection being not a rotary, an entering link and an exiting link are read out. At Step S180, with respect to the rotary, a first dummy link liked with an entering link approaching or entering the rotary and a second dummy link linked with an exiting link receding or exiting from the rotary are read out.

At Step S190, an angle difference is computed between the entering link and exiting link read out at Step S170 or between the first dummy link and second dummy link read out at Step S180. At Step S200, based on the computed angle difference, an advancing direction in which the vehicle should advance is notified while the advancing direction is displayed on an enlarged map around the guidance target.

An advantage of the above navigating process at a rotary will be explained with reference to FIG. 4.

In this embodiment, the map data include dummy links D1 to D4 defined by linking a center of the rotary R with end points of the connection road links La to Ld linked with the rotary links R1 to R6. When a vehicle approaches the rotary R being a guidance target, an advancing direction in which the vehicle should advance is indicated based on an angle difference between (i) the first dummy link linked with a connection road link included in the guidance route for entering the rotary R and (ii) the second dummy link linked with a connection road link included in the guidance route for exiting from the rotary R. For instance, when an entering route includes a connection road link La and an exiting route includes a connection road link Ld, the first dummy link is D1 and the second dummy link is D4. In this case, an angle difference between the dummy links D1, D4 is 90 degrees clockwise, so that a left turn is indicated as an advancing direction of the vehicle.

Providing the dummy links D1 to D4 allows direction guidance at the rotary R to be performed only by using an angle difference between only two links in similarity with a case at a typical intersection. This can decrease processing loads in the ECU 8 and achieve proper direction guidance.

When an entering communication link La1, Ld1 and an exiting communication link La2, Ld2 are present between the rotary R and the connection road link La, Ld, these entering and exiting communication links La1, Ld1, La2, Ld2 are excluded for drawing or forming a dummy link; therefore, a dummy link D1, D4 is formed by linking the center of the rotary R with an end point (rotary-side end point) of the connection road link La, Ld. Angles of the entering communication link La1, Ld1 and exiting communication link La2, Ld2 can be therefore excluded from computing the direction guidance at the rotary R. This can achieve easy-to-follow direction guidance meeting a user's sense. The reason will be explained below.

As shown in FIG. 4, the entering communication links La1, Ld1 and exiting communication links La2, Ld2 have road directions (or orientations) different from those of the connection road link La, Ld. (For instance, the connection road link La and the entering communication link La1 are connected with each other with an angle or at a bent point, instead of being connected with each other in a straight line or same direction.) If an advancing direction in which a vehicle should advance is determined based on the directions of the entering and exiting communication links La1, Ld1, La2, Ld2, the determined advancing direction might be different from what the user senses or feels.

For instance, suppose that a vehicle travels, in order, the connection road link La, the entering communication link La1, the rotary links R1, R2, R3 counterclockwise, to the exiting communication link Ld2, and then the connection road link Ld. In this case, if the entering communication link La1 and exiting communication link Ld2 are regarded as the entering road and exiting road, direction guidance is indicated as "returning to left" based on an angle difference between the entering communication link La1 and exiting communication link Ld2. However, "turning left at the rotary R" meets the sense of the driver who has traveled the connection road link La.

When a vehicle enters the rotary R from the connection road link La and exits to the connection link Ld, using the dummy links D1, D4 allows direction guidance to become "turning left" that meets the sense of the driver.

The above-explained embodiment of a navigation system may be modified within a scope of the present invention.

In the above embodiment, dummy links are provided for a rotary that actually includes an entering communication link and an exiting communication link; however, it is preferable that dummy links are provided for all rotaries regardless of whether an entering or exiting communication link is actually present. This can avoid need to change a process for determining direction guidance depending on rotaries with or without dummy links. Furthermore, a process for determining direction guidance can be at least partially in common for both of a typical intersection and a rotary.

Second Embodiment

A navigation system according to a second embodiment includes components similar to those in the structure shown in FIG. 1; therefore, explanation for similar parts will be basically eliminated. The second embodiment has a difference from the first embodiment in displaying direction guidance and definition of dummy links.

Figures 9, 11:
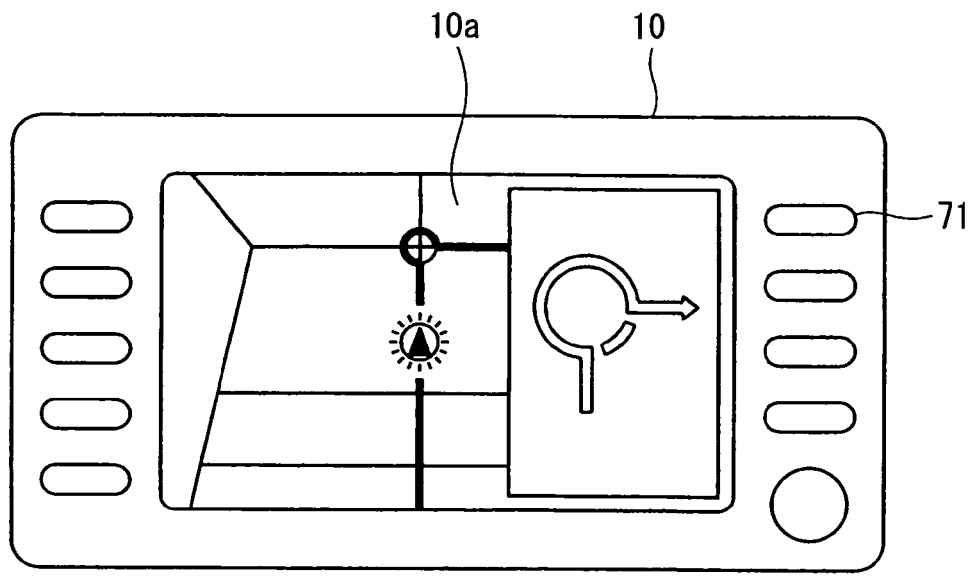
FIG. 9 is a table for describing items of node data and link data.
FIG. 11 is a front view of a display apparatus.
Figure 10A:
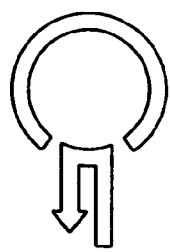
FIGS. 10A to 10I are views illustrating advancing directions at rotaries.
Figure 10B:
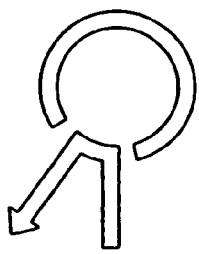
Figure 10C:
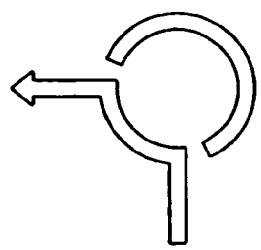
Figure 10D:
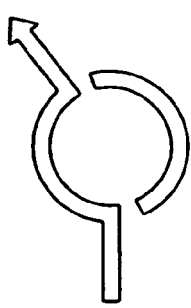
Figure 10E:
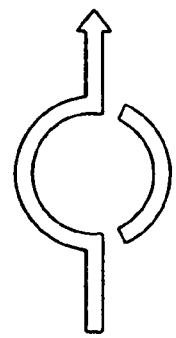
Figure 10F:
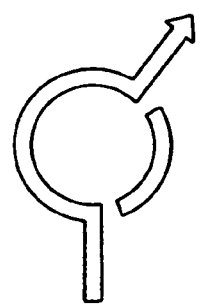
Figure 10G:
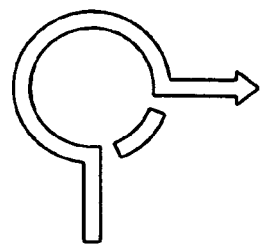
Figure 10H:
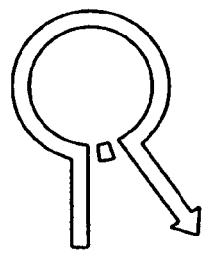
Figure 10I:
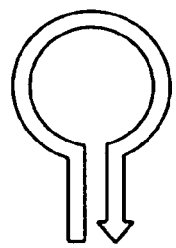

In this embodiment, an enlarged view of an intersection along the route is shown with an advancing direction visually emphasized in a part of the screen 10*a* of the display apparatus 10 as shown in FIG. 11. For instance, when an intersection is a rotary, an enlarged view is displayed to emphasize an advancing route or direction including an entering road, an exiting road, and a part of the rotary between the entering and exiting roads along with an arrow at the tip end (an end opposite to an end facing the rotary) of the exiting road, as shown in FIGS. 10A to 10I.

The road data of the map data is similar to that of the first embodiment. Here, explanation to link data and node data will be added with reference to FIGS. 9, 7. As shown in FIG. 9, link data includes a link ID, a road name, a link length, a road width, a road type or kind (expressway, national road, prefectural road, etc.), coordinates of a start point and end point, a direction, and rotary information (attribute). When a road is a prefectural road or high level road (namely, national road and expressway) and two-way traffic, the road is typically defined by two different directions or links of an up link and a down link. When the two links are defined for a road, each link has a traffic direction in which a vehicle should advance. When a road of two-way traffic has only one common link instead of having two links of up and down links, a traffic direction of the link is not described. The rotary information or attribute includes "rotary" or "round about" only when the link is included in a rotary. For instance, links A to H included in a rotary shown in FIG. 7 have "rotary" in their rotary information.

The node data includes a node ID, coordinates, IDs of connecting links, and an attribute, as shown in FIG. 9. The connecting links are connected with the node. In the attribute of the node data, an "intersection" is described if the node is an intersection. For instance, in FIG. 7, a node Uo, Ui, Vo, Vi, Wo, Wi, Xo, or Xi indicates an intersection and its attribute information includes "intersection." The IDs of connecting links of the node Uo, Ui, Vo, Vi, Wo, Wi, Xo, or Xi individually include three link IDs. For instance, the link IDs of the node Uo include IDs of links H, A, g; the link IDs of the node Ui include IDs of links A, B, b.

Next, a process for computing and outputting an advancing direction at a rotary will be explained with reference to a flowchart in FIG. 5.

Initially, a navigation system 20 is set to a destination set mode using the manipulation switch group 7. When an intended destination is inputted (S301: YES), the ECU 8 retrieves a route from the current position to the destination with reference to map data obtained from the map data input unit 6 (S302). The ECU 8 causes the screen 10*a* of the display apparatus 10 to display the retrieved route as a guidance route over a displayed map while storing links and nodes included in the guidance route in the external memory 9 (Step S303). When a user requires a guidance start using the manipulation switch group 7 (Step S304: YES), the ECU 8 starts route guidance to navigate the vehicle along the guidance route.

After staring the route guidance, the ECU 8 determines whether the vehicle approaches an intersection on the guidance route within a given distance (e.g., 300 m) using position information from the position detector 1 (Step S305). Whether an intersection is present within the given distance is determined as follows: The ECU 8 reads out the links and nodes stored in the external memory 9 and retrieves nodes present within the given distance while referring to link data of the map data; and the ECU 8 determines whether a node included in the retrieved nodes has attribute information of "intersection"; and, when a node is determined to have attribute information of "intersection," it is determined that the vehicle approaches an intersection within the given distance.

When the vehicle is determined to approach an intersection (Step S305: YES), the ECU 8 then determines whether the intersection is a rotary or not (Step S306). Whether the intersection is a rotary or not is determined by whether a link connected with the node of the intersection has the rotary information of "rotary." When the intersection is determined to not be a rotary (Step S306: NO), the ECU 8 obtains a plan view of roads connected with the intersection from the map data. The ECU 8 then causes a half portion of the screen 10*a* to display an enlarged view of the obtained plan view further with an advancing direction of the vehicle indicated on the enlarged view (Step S307). Furthermore, the advancing direction is notified to the user via voice. When the vehicle has passed through the intersection, the displayed enlarged view disappears.

When the intersection the vehicle approaches is determined to be a rotary (Step S306: YES), the ECU 8 determines whether each of an entering road to the rotary and an exiting road from the rotary are a prefectural road or a lower level road (e.g., city road, town road, local road) (Step S309). When the road is a prefectural road or a lower level road (Step S309: YES), the ECU 8 forms extension lines by extending, by, e.g., 20 m, the entering road and the exiting road from points connected with the rotary and computes an angle formed of the two extension lines (Step S310), which will be specifically explained with reference to FIG. 8.

Figure 8:
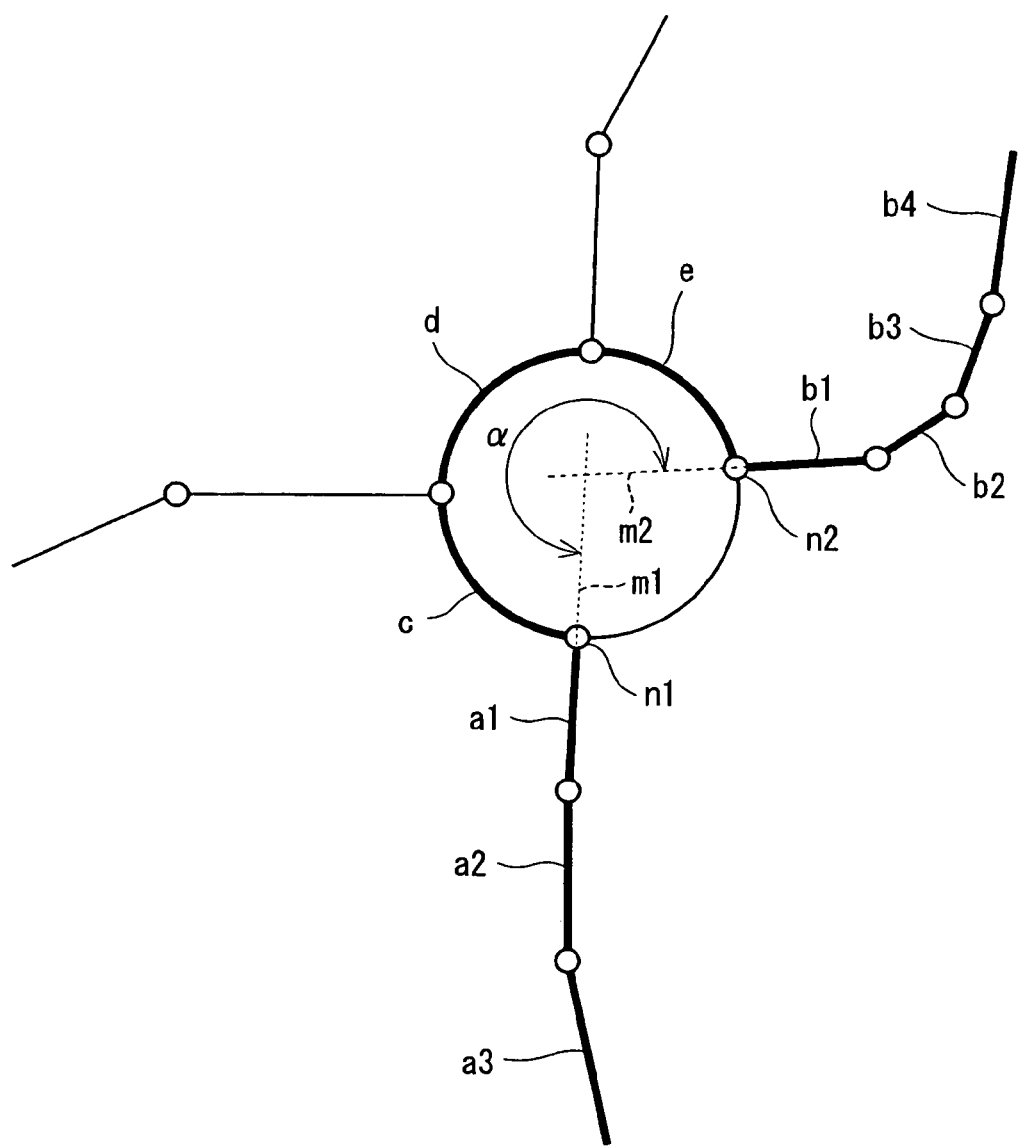
FIG. 8 is a view explaining another process for determining an advancing direction at a rotary according to the second embodiment.

FIG. 8 illustrates a rotary and its related roads using links and nodes, while the guidance route is shown in a bold line. The entering road (links a3, a2, a1) and exiting road (links b1, b2, b3, b4) belong to prefectural roads. Virtual extension lines m1, m2 are formed by extending the entering and exiting roads by 20 m from connecting points (nodes n1, n2) in the respective directions of connecting links a1, b1 towards an inside of the rotary. An angle α is thus formed by two extension lines m1, m2 as dummy or virtual links, as shown in FIG. 8. The coordinates of both ends of the connection links a1, b1 are described in the link data, so that directions of the extension lines m1, m2 can be computed. The angle α can be computed by using the extension lines m1, m2.

In contrast, when the road is a national road or a higher level road (e.g., expressway) (Step S309: NO), the ECU 8 computes given points that are, by a given distance, e.g., 500 m away from or receding from connecting points connected with the rotary (Step S311). Next, the ECU 8 computes straight lines including (i) the given points and (ii) the connecting points with the rotary (Step S312), and then computes an angle α formed by the two straight lines (Step S313), which will be explained in detail below.

Figure 6:
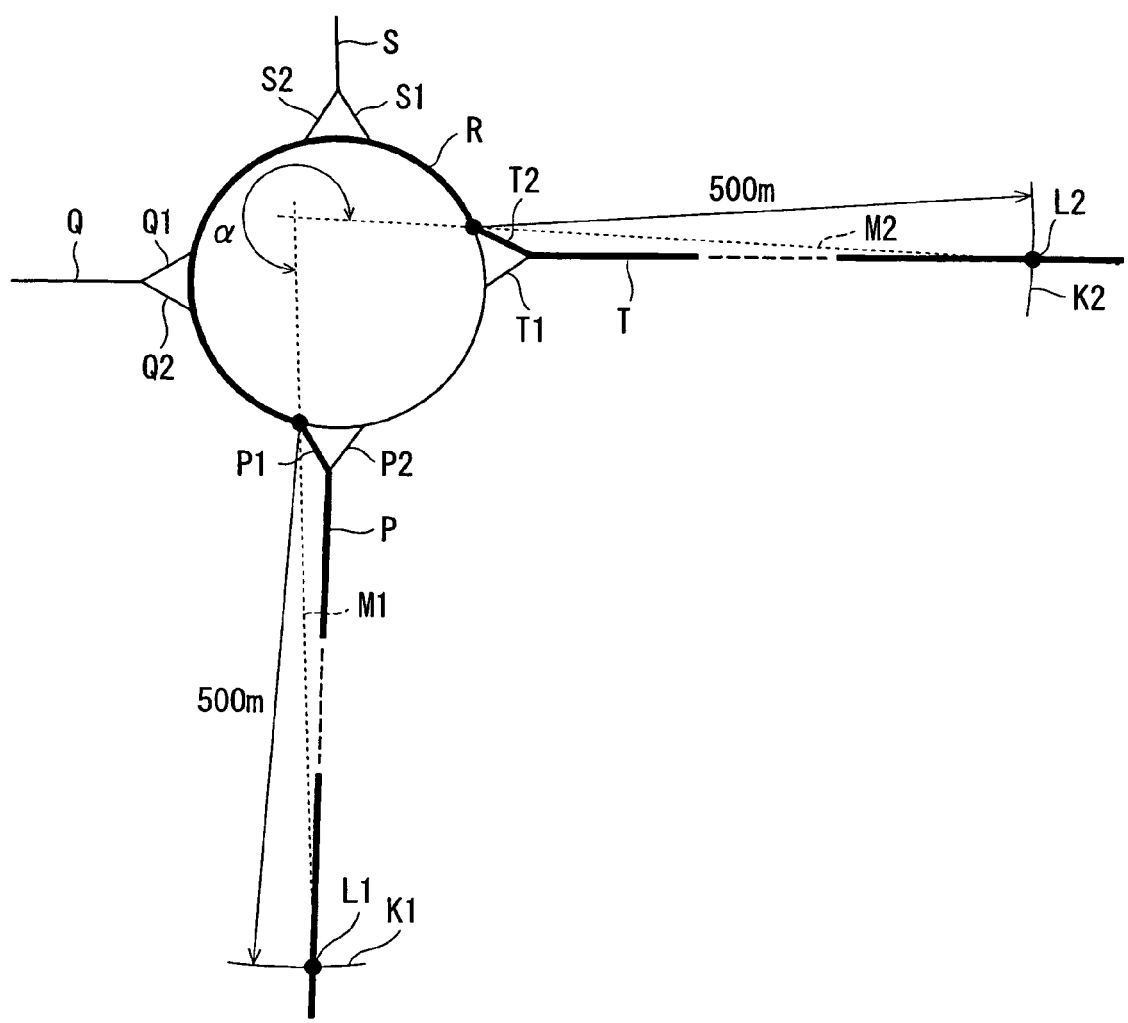
FIG. 6 is a view explaining a process for determining an advancing direction at a rotary according to the second embodiment.

FIG. 6 illustrates a rotary and its related roads, while the guidance route is shown in a bold line. Each of four roads P, Q, S, T connected with the rotary is two-way traffic and divided into two on-way traffic branch road portions P1, P2, Q1, Q2, S1, S2, T1, T2 at a point near a connecting point connected with the rotary. A vehicle travels the rotary clockwise; therefore, the branch road portions P1, Q1, S1, T1 are entering the rotary (as an entering communication link); the branch road portions P2, Q2, S2, T2 are exiting from the rotary (as an exiting communication link).

Figure 7:
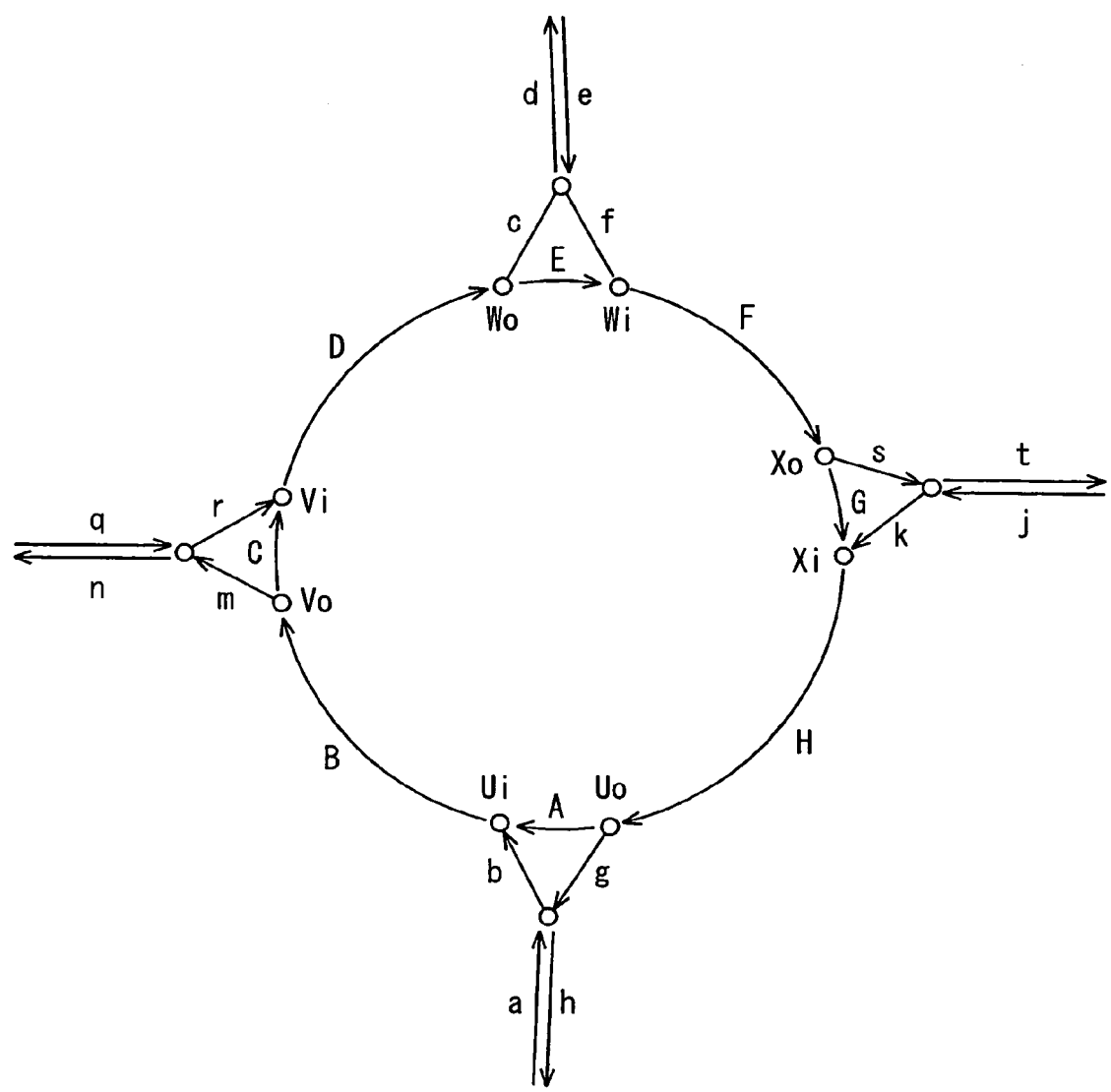
FIG. 7 is a view of a rotary in FIG. 6 by using nodes and links.

FIG. 7 indicates roads in FIG. 6 by using nodes and links. The links a, h indicate up and down of the road P, respectively; the links b, g indicate the branch road portions of the roads P1, P2, respectively. The links q, n indicate up and down of the road Q, respectively; the links r, m indicate the branch road portions of the roads Q1, Q2, respectively. The links e, d indicate up and down of the road S, respectively; the links f, c indicate the branch road portions of the roads S1, S2, respectively. The links j, t indicate up and down of the road T, respectively; the links k, s indicate the branch road portions of the roads T1, T2, respectively.

A connecting point between the entering road P (link b) and the rotary corresponds to the node Ui; a connecting point between the exiting road T (link s) and the rotary corresponds to the node Xo. These connecting points can be retrieved from the node Ui, Xo, respectively. Circles K1, K2 are drawn with radiuses of 500 m by defining circle centers as the connecting points Ui, Xo, to intersect the roads P, T at points L1, L2 being 500 m away from the connecting points.

Coordinates of the points L1, L2 are computed based on (i) coordinates of points on the circles K1, K2 obtained from the coordinates of the nodes Ui, Xo and (ii) coordinates between both ends of links including the points L1, L2, respectively. Straight lines M1, M2 as dummy or virtual links are formed by including (i) the node Ui, Xo and (ii) the points L1, L2; then, inclinations of the straight lines M1, M2 are computed. An angle α defined to be from the straight line M1 to the straight line M2 along one-way traffic direction is computed, as shown in FIG. 6.

Next, the ECU 8 determines an advancing direction or passing direction based on the angle α (Step S314) and displays on the screen 10a the determined advancing direction based on a database prescribing relationship of an angle α and advancing direction. For instance, when $0 \leq \alpha \leq 10$ degrees, an advancing direction is determined to be "left return direction" and displayed as FIG. 10A; when $10 < \alpha \leq 60$ degrees, an advancing direction is determined to be "greatly left direction" and displayed as FIG. 10B; when $60 < \alpha \leq 120$ degrees, an advancing direction is determined to be "left direction" and displayed as FIG. 10C; when $120 < \alpha \leq 170$ degrees, an advancing direction is determined to be "slightly left direction" and displayed as FIG. 10D; when $170 < \alpha \leq 190$ degrees, an advancing direction is determined to be "straight direction" and displayed as FIG. 10E; when $190 < \alpha \leq 240$ degrees, an advancing direction is determined to be "slightly right direction" and displayed as FIG. 10F; when $240 < \alpha \leq 300$ degrees, an advancing direction is determined to be "right direction" and displayed as FIG. 10G; when $300 < \alpha \leq 350$ degrees, an advancing direction is determined to be "greatly right direction" and displayed as FIG. 10H; and when $350 < \alpha \leq 360$ degrees, an advancing direction is determined to be "right return direction" and displayed as FIG. 10I.

When an advancing direction is determined (Step S314: YES), the ECU 8 outputs the determined advancing direction via the speaker 13 while displaying a view based on the determined advancing direction on the screen 10a of the display apparatus 10 and further displaying an corresponding enlarged view in the right portion of the screen 10a (Step S315). When the vehicle has passed through the rotary (Step S316: YES), the enlarged view disappears from the screen 10a.

The above process of direction guidance at a typical intersection and rotary is repeated at each intersection or rotary until the vehicle reaches the destination (Step S317: YES).

Thus, this embodiment can be adapted to the following case. Suppose a case where the entering road P1, Q1, S1, T1 to the rotary R and the exiting roads P2, Q2, S2, T2 from the rotary R are bent or curved as shown in FIG. 6. In this case, an advancing direction is determined by an angle α formed by two virtual lines M1, M2 linking both of (i) the connecting points and (ii) points on the entering road and exiting road by 500 m away from the connecting points with the rotary. For instance, even if an entering road or an exiting road has one-way traffic forked branch road portions, an advancing direction can be properly determined without being affected by the bent portion of the branch road portions. This allows the direction guidance to meet the user's sense or feeling.

Suppose another case where an entering or exiting road is a prefectural road or lower level road. In this case, the road may have more curved portions, so that a point 500 m away from the connecting point with the rotary may be located in a direction different from a direction in which the entering road enters the rotary. This may cause a direction guidance not meeting the user's actual sense or feeling if an advancing direction is determined by the above computation method using points 500 m away from the connecting points with the rotary.

Therefore, in this embodiment, instead of using a point 500 m away from the connecting point, a road portion on the entering or exiting road having a length of 20 m away from the connecting point is extended. An angle that is formed the extended lines (or virtual lines) with respect to the entering and exiting roads is used for determining an advancing direction. This allows the direction guidance to meet the user's sense or feeling.

OTHER EXAMPLES

Figure 12:
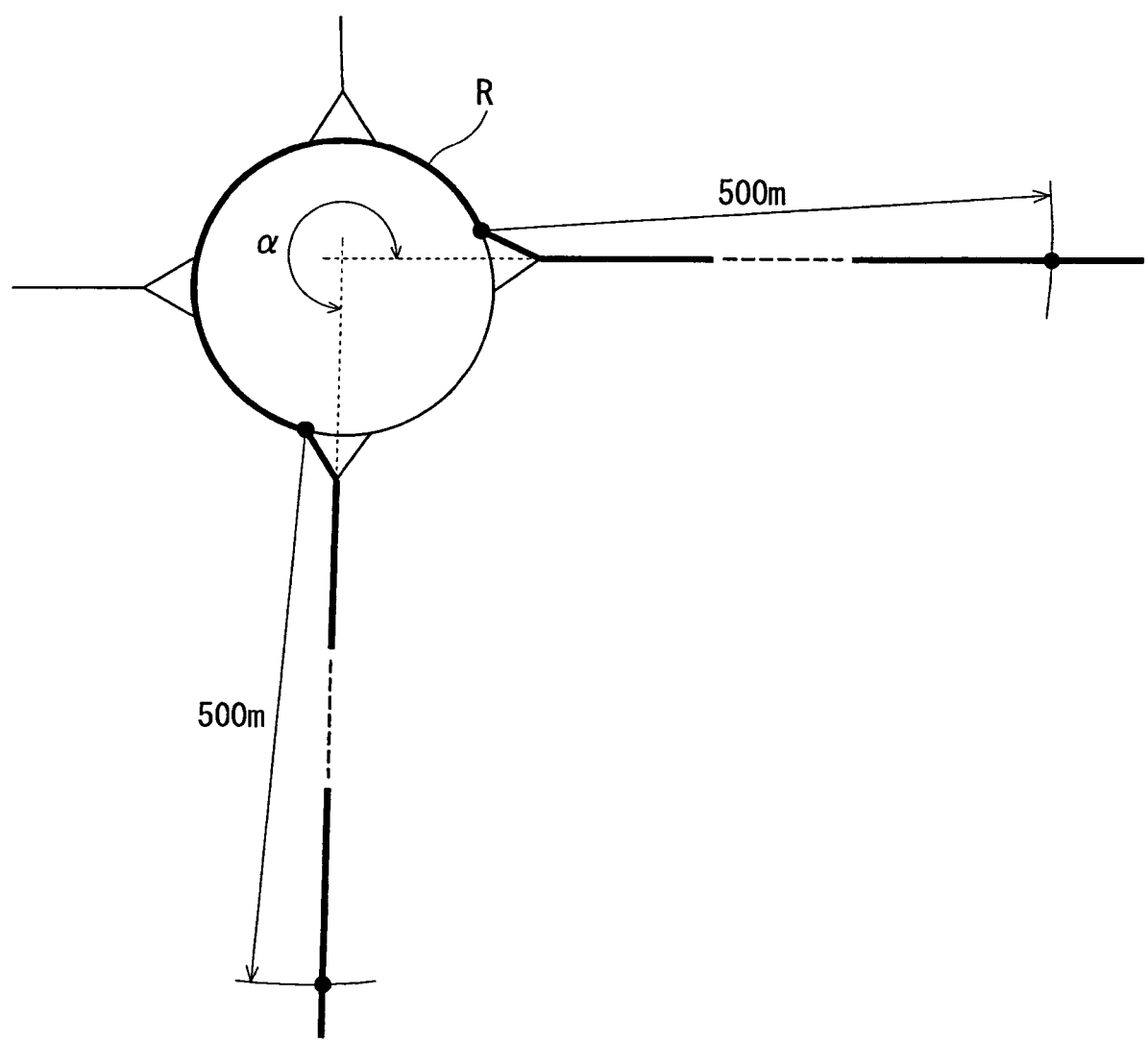
FIG. 12 is a view explaining another process for determining an advancing direction at a rotary according to the second embodiment.
Figure 13:
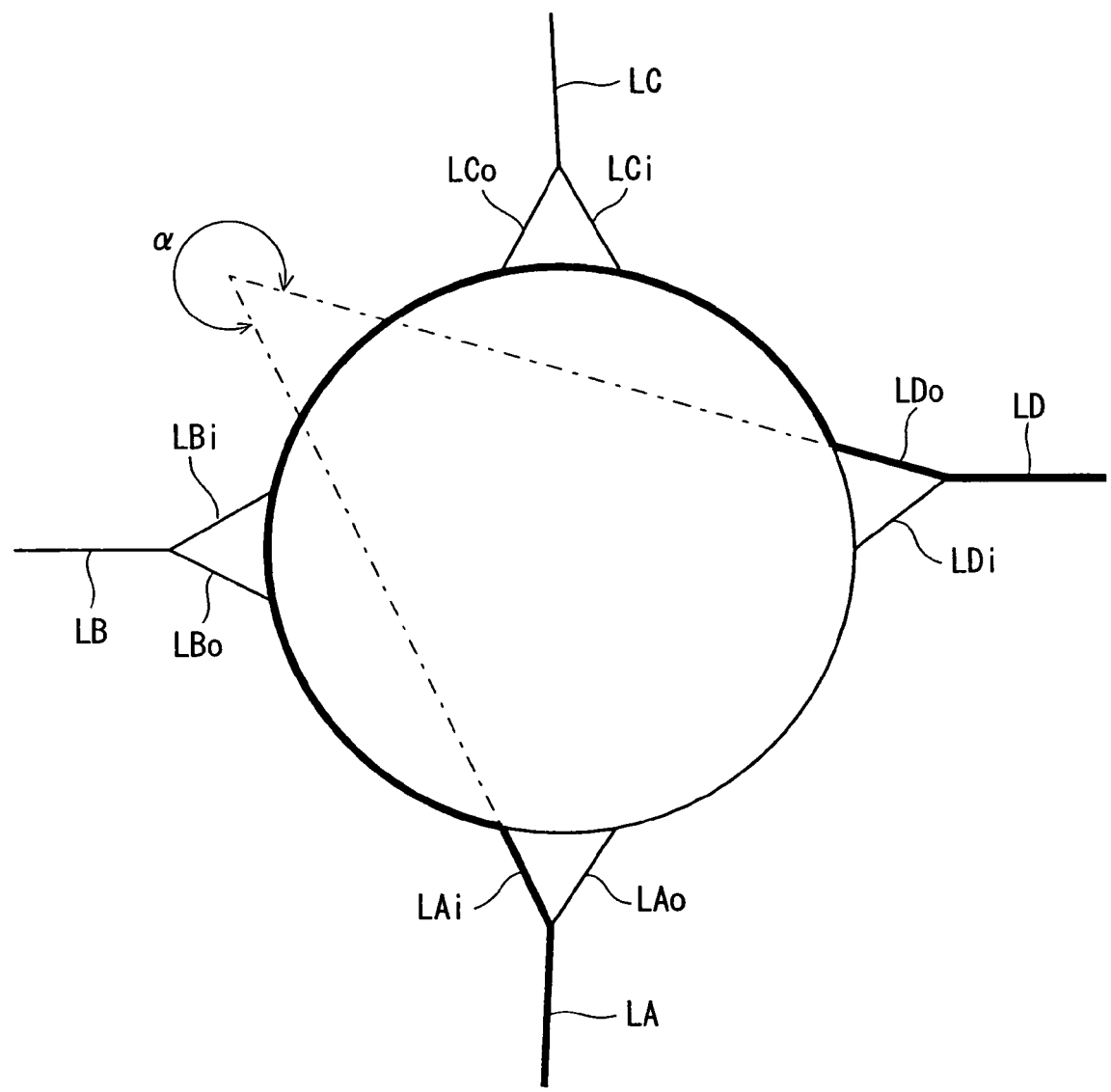
FIG. 13 is a view explaining a process for determining an advancing direction at a rotary in a prior art.

FIG. 12 shows another example of this embodiment. In this example, with respect to an entering road and exiting road, a given point by a given distance (e.g., 500 m or 100 m) away from the connecting point with the rotary is sampled; a road portion having a certain length from the given point towards the connecting point is designated; the designated road portion is extended to an inside of the rotary; an angle is defined by the extended road portions or lines (virtually extended lines with respect to the entering and exiting roads); and the angle is used for determining an advancing direction at the rotary.

Other Modifications

The second embodiment can be modified below, without limited to the above explanation.

To sample a given point, with respect to the entering or exiting road, by a given distance away from the connecting point with the rotary, this given distance is specified e.g., as 500 m; however, this given distance can be varied depending on the road types, e.g., 500 m for a national road or higher level road or 200 m for a prefectural road or lower level road.

In FIG. 8, when either the entering road or exiting road is a national road (i.e., an up link and down link are defined in the map data), the following is applied to determining an angle α and an advancing direction: with respect to the national road, a first straight extended line is drawn by including both of (i) the connecting point with the rotary and (ii) a point by 500 m away from the connecting point; in contrast, with respect to a prefectural road or lower level road, a second straight extended line is drawn by using a range of 20 m from the connecting point; and an advancing direction is determined based on an angle formed by two first and second straight extended lines.

A point 500 m away from the connecting point is not always determined by drawing a 500 m radius circle centering at the connecting point; alternatively, a point 500 m away from the connecting point may be determined as a point 500 m away along the road from the connecting point.

Furthermore, an advancing direction at the rotary can be notified via only either the screen 10a or speaker 13.

Individual processing or execution explained in the above embodiment, e.g., using the flowchart can be constructed as a unit or means in a program stored in the ROM or the like and executed by using the CPU or the like. Furthermore, the unit can be also realized as a firmware or a device.

It will be obvious to those skilled in the art that various changes may be made in the above-described embodiments of the present invention. However, the scope of the present invention should be determined by the following claims.

What is claimed is:

1. A navigation system in a vehicle, the system comprising:
   a position detector configured to detect a current position of the vehicle;
   a map data storage unit configured to store road map data indicating a road by links;
   a route designating unit configured to designate a guidance route to a destination based on the road map data; and
   a navigating unit configured to indicate an advancing direction, in which the vehicle should advance at a guidance target included in the guidance route, when the current position approaches the guidance target,
   the road map data including a dummy link defined by linking a center of a rotary with an end point of a connection road link that is connected at the end point with a rotary link having an attribute associated with the rotary, and
   when a rotary is the guidance target,
   the navigating unit is configured to
      designate (i) a first dummy link linked with a connection road link corresponding to a guidance route entering the rotary and (ii) a second dummy link linked with a connection road link corresponding to a guidance route exiting from the rotary, and
      indicate an advancing direction of the vehicle at the rotary based on an angle difference between the first dummy link and the second dummy link,
   the dummy link being defined with respect to a certain rotary link that is associated with a certain rotary and linked with at least one connection road link via both an entering communication link and an exiting communication link, the entering communication link being for entering the rotary link and an exiting communication link being for exiting from the rotary link, both the entering communication link and the exiting communication link having different directions from each other and from a direction of the at least one connection road link, and
   with respect to the certain rotary link, a dummy link being defined by linking a center of the certain rotary with an end point of the at least one connection road link, while excluding the entering communication link and the exiting communication link of the certain rotary link.

2. The navigation system of claim 1, further comprising:
   a display unit; and
   a display control unit configured to cause the display unit to display a road map including the guidance route based on the road map data by using links excluding any dummy link.

3. The navigation system of claim 1, the navigating unit indicating the advancing direction by outputting a sound.

4. The navigation system of claim 1,
   the road map data including dummy links with respect to all rotary links included in the road map data.

5. A navigation system in a vehicle for navigating along a guidance route to a destination, the system comprising:
   a position detector configured to detect a current position of the vehicle;
   a dummy link acquiring unit configured to acquire a dummy link with respect to a connection road linked with a rotary included in the guidance route, the dummy link being defined to extend towards an inside of the rotary based on road map data;
   an advancing direction computing unit configured to compute an advancing direction at the rotary by using an angle defined by two dummy links with respect to both (i) an entering road being the connection road on which the vehicle is to approach the rotary and (ii) an exiting road being the connection road on which the vehicle is to recede from the rotary; and
   a navigating unit configured to indicate guidance information at the rotary based on the computed advancing direction when the current position of the vehicle approaches the rotary,
   the dummy link being defined to link an inside center of the rotary with an end point of the connection road that is connected at the end point with the rotary, and
   the dummy link being defined, with respect to at least a first connection road that is linked with a rotary via a one-way traffic communication link, which is connected with the first connection road at a bent point and is used for one of (i) entering the rotary and (ii) exiting from the rotary, to extend the first connection road towards an inside of the rotary with the one-way traffic communication link excluded.

6. The navigation system of claim 5,
   the dummy link being alternatively defined, with respect to each of the entering road and the exiting road, to include (i) a connecting point connected with the rotary and (ii) a given point by a given distance away from the connecting point.

7. The navigation system of claim 6, wherein
   when the advancing direction computing unit computes the dummy link, the given distance is varied depending on a road type of each of the entering road and the exiting road.

8. The navigation system of claim 6,
   the dummy link being defined, with respect to a second connection road that is represented on the road map data by using an up direction and a down direction, to include (i) a connecting point connected with the rotary and (ii) a given point by a given distance away from the connecting point, whereas
   the dummy link being defined, with respect to a third connection road that is not represented on the road map data by using an up direction and a down direction, to extend the third connection road from the connecting point.

9. The navigation system of claim 5,
   the dummy link being defined, with respect to a connection road, to extend in a road direction of a given point that is by a given distance away from a connecting point connected with the rotary.

* * * * *